(No Model.)

S. J. HURLEY.
HORSESHOE PLIERS.

No. 382,263. Patented May 1, 1888.

Witnesses:
Chas. B. Shumway.
Harry Hall.

Inventor.
Simon J. Hurley.
By George D. Seymour.
Atty.

N. PETERS, Photo-Lithographer, Washington, D. C.

UNITED STATES PATENT OFFICE.

SIMON J. HURLEY, OF NEW HAVEN, CONNECTICUT, ASSIGNOR OF ONE-HALF TO PATRICK McDERMOTT, OF SAME PLACE.

HORSESHOE-PLIERS.

SPECIFICATION forming part of Letters Patent No. 382,263, dated May 1, 1888.

Application filed November 11, 1886. Serial No. 218,634. (No model.)

*To all whom it may concern:*

Be it known that I, SIMON J. HURLEY, a citizen of the United States, residing at New Haven, in the county of New Haven and State of Connecticut, have invented certain new and useful Improvements in Hoof-Hooks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to an improved combined tool for cleaning and removing obstructions from the hoofs of horses, the object being to provide a cheap, compact, light, strong, and efficient article for the purpose indicated, and one adapted to meet all ordinary exigencies on the road.

With these ends in view my invention consists in a combined tool having certain details of construction and combinations of parts, as will be hereinafter described, and pointed out in the claims.

Figure 1:
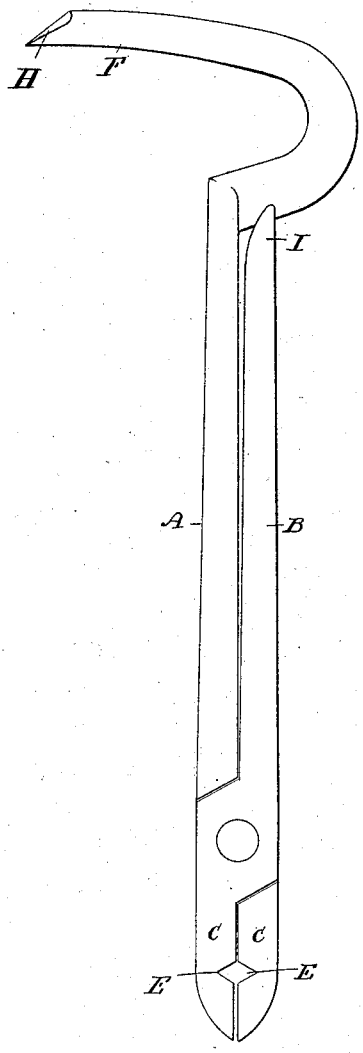
Figure 2:
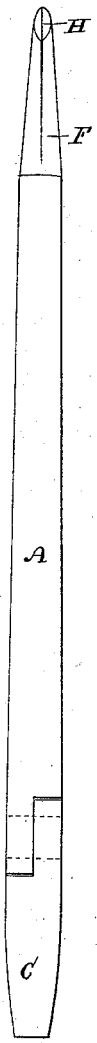
Figure 3:
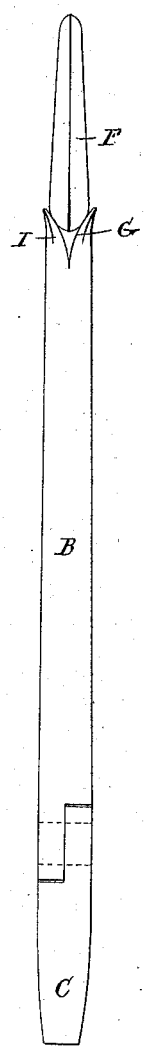

In the accompanying drawings, Figure 1 is a view in side elevation of my improved combined tool. Fig. 2 is a view thereof in edge elevation, looking into the hook; and Fig. 3 is a similar view, looking at the back of the hook.

The tool has the general form of a pair of nipping-pliers having levers A and B, provided with jaws C C, and united by a pivot, D, as shown. Each of the said jaws has a V-shaped slot, E, opening outward, formed in its inner face and about midway of its length. These two slots adapt the jaws for the extraction of nails from the hoofs. A cleaning-hook, F, formed by the extension of the outer end of the lever A, is turned inward or toward the lever B, and then bent outward to give it the required depth, whereby it is adapted to penetrate into every part of the hoof. This hook is flattened or oblong in cross-section, its longest axis being parallel with the longest axes of the levers and in the same plane with the sides thereof. It tapers gradually from its inner to its outer end, which is beveled and pointed, as at H. Being deep, thin, approximately flat, tapering, and beveled, and pointed at the end, as described, the hook is eminently adapted for ready access to every part of the hoof without injury thereto. In using the jaws of the tool, which is then reversed in the hand, the hook also forms an admirable purchase for the hand. A notch, G, formed in the outer end of the lever B, adapts the same to ride over and engage with the narrow back of the hook F at a point where such hook offsets from the levers A, whereby, when the levers are shut together, as shown by the drawings, they are unified, so to speak, and form a rigid and convenient handle for the manipulation of the hook in the hoof. It will thus be seen that the bending of the hook, as described, not only gives it the required depth, but serves the additional purpose of forming a bond or tie between the two levers. The slotted end of the lever B is also beveled, as at *l*, whereby the lever is adapted for drawing nails from the hoof. This lever is also valuable on account of the described formation of its end for engaging with and prying out obstructions from the hoof and also for drawing nails therefrom.

Having fully described my invention, what I claim as new, and desire to secure by Letters Patent, is—

1. A combined tool for cleaning and removing obstructions from horses' hoofs, consisting in two levers pivoted together and each provided with a jaw, one of the levers being provided at its opposite end with a hook bent inward toward the other lever and then outward, and the other lever being adapted to ride over and engage with the back of such hook at the point where the same offsets from the lever, of which it forms an extension, substantially as set forth.

2. A combined tool for cleaning and removing obstructions from horses' hoofs, consisting in two levers pivoted together and each provided with a jaw, one of the levers being provided at its opposite end with a hook bent inward toward the other lever and then outward, and the other lever being notched at its outer end to ride over and engage with the narrow back of the hook, which is oblong in cross-section, tapering from its inner end outward, and beveled and pointed at its outer end, substantially as set forth.

In testimony whereof I affix my signature in presence of two witnesses.

SIMON J. HURLEY.

Witnesses:
 LUCIEN P. DEMING,
 WILLIAM S. CASE.